United States Patent [19]

Anderson

[11] 3,976,135

[45] Aug. 24, 1976

[54] METHOD OF FORMING A HIGHLY PERMEABLE SOLID MASS IN A SUBTERRANEAN FORMATION

[75] Inventor: Buddy W. Anderson, Lafayette, La.

[73] Assignee: Halliburton Company, Duncan, Okla.

[22] Filed: Oct. 15, 1974

[21] Appl. No.: 514,709

Related U.S. Application Data

[63] Continuation-in-part of Ser. No. 294,429, Oct. 2, 1972, abandoned.

[52] U.S. Cl. .............................. 166/276; 166/295
[51] Int. Cl.² ........................................ E21B 43/02
[58] Field of Search ........... 166/276, 278, 280, 294, 166/295

[56] References Cited
UNITED STATES PATENTS

| | | | |
|---|---|---|---|
| 2,941,594 | 6/1960 | Ladd et al. | 166/276 |
| 3,001,583 | 9/1961 | Nevins et al. | 166/295 |
| 3,237,693 | 3/1966 | Huitt et al. | 166/280 |
| 3,302,719 | 2/1967 | Fischer | 166/295 |
| 3,316,965 | 5/1967 | Watanabe | 166/295 |
| 3,330,350 | 7/1967 | Maly | 166/295 |
| 3,366,178 | 1/1968 | Malone et al. | 166/280 |
| 3,368,623 | 2/1968 | Carter et al. | 166/276 |
| 3,455,390 | 7/1969 | Gallus | 166/295 |

*Primary Examiner*—Ernest R. Purser
*Assistant Examiner*—Jack E. Ebel
*Attorney, Agent, or Firm*—Robert S. Nisbett; John H. Tregoning; Thomas R. Weaver

[57] ABSTRACT

The present invention relates to a method of forming a highly permeable solid mass in a subterranean formation wherein a mixture of particulated solids and a resin composition are deposited in the formation and consolidated into a hard permeable mass, the particulated solids including soluble solids.

18 Claims, No Drawings

METHOD OF FORMING A HIGHLY PERMEABLE SOLID MASS IN A SUBTERRANEAN FORMATION

This is a continuation-in-part application of application Ser. No. 294,429 filed Oct. 2, 1972, and now abandoned the entire original disclosure of which is hereby incorporated herein by reference.

Methods of forming and placing permeable solid masses in subterranean formations have been developed heretofore, particularly for controlling loose or incompetent sands therein. The permeable solid masses prevent the movement of such sands with produced or injected fluids. The term "subterranean formation" is used herein to mean an underground earth formation penetrated by a well bore including the face of the formation.

One of the more successful methods of forming a permeable solid mass in a subterranean formation involves introducing a quantity of a thermosetting resin composition or resin forming composition into the formation followed by a hardening agent which causes the composition to harden and consolidate loose sand in the formation into a hard permeable mass.

Another method which has been utilized successfully in forming permeable solid masses in subterranean formations involves dispersing a resin composition in a carrying liquid, introducing particulated solid material into the resin composition-carrying liquid dispersion so that the solid material is coated with the resin composition and then injecting the resin composition-solids-carrying liquid mixture into the formation so that the resin composition coated solids are deposited against the formation at a desired location therein. The resin composition is then caused to cure or harden by contacting it with a hardening agent, generally contained in an overflush solution.

While these and other methods can be used to prevent the migration of incompetent solids in subterranean formations, the formations often exhibit less than desired permeability after treatment which results in an overall reduction in fluid production therefrom. The consolidated solids may have adequate permeability, but the permeability of the interface between the consolidated solids and the formation solids is often reduced due to accumulations of resin composition at the interface, and/or the plugging off of the pore spaces of the consolidated mass by the smaller formation solids. By the present invention, a method of forming a highly permeable solid mass in a subterranean formation is provided wherein problems associated with reduction in formation production are minimized.

The present invention broadly comprises combining a quantity of particulated solid material with a quantity of a resin composition wherein the particulated solid material is comprised of a mixture of inert solids which are coated by the resin composition and soluble solids which are not coated by the resin composition. The resin composition-solids mixture is deposited in or against a subterranean formation and the resin composition is caused to harden so that the resin coated solids are consolidated into a hard permeable mass with the uncoated soluble solids distributed throughout the mass. The uncoated soluble solids are then dissolved so that a highly permeable solid mass is formed in the formation.

This highly permeable solid mass is particularly useful as a gravel packing material and is commonly placed between a gravel packing solids retainer in a well bore penetrating a subterranean formation and the subterranean formations. The gravel packing solids retainer is generally a part of the well completion conduit and extends through the portion of a subterranean formation which contains incompetent sands. Many gravel packing solids retainers such as slotted liners and screens are used. After the gravel packing solids retainer has been placed in the well bore adjacent to a subterranean formation containing incompetent sand, a sufficient quantity of the resin composition-solids mixture is deposited between the gravel packing solids retainer and the subterranean formation to fill the annulus defined by the gravel packing solids retainer and the subterranean formation. The resin composition-solids mixture is then hardened to a hard permeable mass to prevent the incompetent sand from moving into the completion conduit as fluids are produced from the subterranean formation. After forming the hard permeable mass, the soluble solids are then dissolved so that a highly permeable mass is formed. This hard highly permeable mass generally contacts the gravel packing solids retainer and the subterranean formation.

A variety of resin compositions can be employed in carrying out the method of the present invention. Preferred such resin compositions are liquid, organic, thermosetting, resins; resin forming chemicals; and mixtures thereof. The resin composition autopolymerizes when contacted with a hardening agent to form an insoluble highly chemically resistant solid material. Particularly suitable resin compositions for use in accordance with the present invention are those selected from the group consisting of urea formaldehyde resin, melamine resin, phenol formaldehyde resin, epoxy resin, polyurethane resin, polyester resin and furfuryl alcohol resin. Of these, mixtures of furfuryl alcohol and furfuryl alcohol resin, furfuryl alcohol and phenol formaldehyde resin and furfuryl alcohol and urea formaldehyde resin, having viscosities of less than about 100 cps at 25°C, are preferred. The most preferred resin composition is a mixture of furfuryl alcohol and furfuryl alcohol resin having a viscosity in the range of about 5 to 25 cps at 25°C. The resin composition may also contain water and other components such as an organo-functional silane coupling agents, demulsifying surfactants, clay conditioning chemicals, etc.

The inert particulated solids most suitable for use in accordance with the present invention are those commonly used in well sand packing procedures. A 40–60 mesh (U.S. Sieve Series) sand is particularly suitable.

Suitable soluble particulated solids which can be utilized in accordance with the present invention are those which are not coated by the resin composition used and which are dissolved by formation fluids or other fluids introduced into the formation after being placed therein. Particulated solid material made from homogeneous mixtures or blends of hydrocarbons and polymers are particularly suitable. The softening and melting points of such hydrocarbon-polymer blends may vary depending upon the particular hydrocarbon and polymer utilized and the proportion of each present. Hydrocarbonpolymer solid particles which are substantially insoluble in hydrocarbon liquids at ambient temperatures but which are soluble in hydrocarbon liquids at higher temperatures are preferred. Thus, the solids may be delivered to the subterranean formation in a hydrocarbon liquid carrier without being dissolved thereby, but are readily dissolved by formation fluids upon reaching the temperatures existing in the formation. The most preferred such hydrocarbon-polymer solid materials are those comprised of a homogeneous mixture of a hydrocarbon wax and a polymer selected from the group consisting of copolymers of ethylene and vinyl acetate and copolymers of ethylene and ethyl acetate. These hydrocarbon-polymer solids are commercially available in various particle sizes and softening and melting points.

Other solid materials which are not coated by the resin composition utilized and which are soluble in either injected or produced formation fluids can be utilized in accordance with the present invention. For example, particulated urea is not readily coated by the above-described resin compositions and may be used in formations producing water or brine. Alternatively, water, brine or acid solutions may be injected into the formation through a permeable consolidation containing the granular urea to bring about the dissolution thereof.

A particularly effective technique for depositing the resin composition-particulated solids mixture of the present invention in subterranean formations is to first disperse a quantity of the resin composition into a quantity of a carrier liquid. A quantity of inert particulated solid material which is coated with the resin composition used, e.g. sand, is introduced into the carrier liquid-resin composition dispersion and agitated. A quantity of soluble particulated material which is not coated by the resin composition used in next combined with the resin composition-carrier liquid-inert solids mixture in a manner such that the soluble solids are distributed throughout the mixture. Alternately, the inert and soluble solids can be mixed together prior to introduction into the carrier liquid-resin composition dispersion. The resulting resin composition-carrier liquid-solids mixture is deposited in a desired zone of the subterranean formation, normally by pumping the mixture through the well bore into and against the formation until the desired amount of solids is deposited against the face of the formation.

The carrier liquid is preferably a liquid aliphatic or aromatic hydrocarbon having a viscosity such that it can readily be injected into the formation to be treated and through the resin coated solids as they are deposited therein. Generally, a viscosity at 25°C of less than 100 cps is suitable. The most preferred carrier liquid for use in accordance with the method of the present invention is an aliphatic hydrocarbon such as diesel oil having a viscosity in the range of about 1 to 25 cps at 25°C.

Once the solids-resin composition mixture has been placed in the formation, the resin composition is caused to harden by contact with a hardening agent. A variety of hardening agents can be used depending on the particular resin composition used. When an acid curable resin composition of the preferred type mentioned above is used, an acid or acid forming hardening agent such as trichloroacetic acid or phthaloyl chloride is preferred. The contact of the resin composition with the hardening agent can take place in a variety of ways. For example, the resin composition can contain a hardening agent which functions after the composition is placed in the formation, or an aqueous or hydrocarbon liquid overflush solution containing the hardening agent can be injected into the formation after deposition of the solids-resin composition mixture therein. After the consolidation process has been completed, a permeable mass capable of allowing fluids to pass therethrough is formed in the formation with the soluble particulated material distributed therein. The formation can then be returned to production so that produced fluids pass through the permeable mass and dissolve the soluble solids, or fluids may be injected through the mass to dissolve the soluble solids so that a highly permeable mass is provided.

The soluble solids utilized are preferably of the same particle size as the inert solids used so that the soluble solids will not flow through the pore spaces of the inert solids and so that the soluble solids do not cause an uneven distribution of the inert solids in the resultant consolidated mass.

The amount of resin composition introduced into the carrier liquid should be sufficient to coat the inert solids to be placed in the formation, and by using more resin than needed to coat the inert solids, the excess resin is extracted onto the formation solids and subsequently hardened thereby consolidating at least a portion of the formation solids. Generally, from about 1% to about 6% by volume resin composition is dispersed in the carrier liquid and the particulated solid material is added to the resulting dispersion in an amount of from about 0.5 to about 5 pounds of solids per gallon of dispersion. Soluble solid material is added to the dispersion, either simultaneously with the inert solids or subsequent thereto, in an amount of from about 1% by weight to about 30% by weight of the total solids utilized. At a soluble solids concentration of 1% by weight of the total particulated solid material utilized, improvement in the permeability of the resulting consolidated mass is obtained. As will be understood, the strength of the consolidated mass decreases as the concentration of soluble solids used increases. At a soluble solids concentration above about 30%, the compressive strength of the resultant consolidated mass is generally inadequate. When using the resin compositions described above and sand particles as the inert solid material, the concentration of soluble solids is preferably in the range of from about 1% to about 20% by weight of total solids.

The following examples are presented to more clearly illustrate the invention, but are not to be considered as limiting the scope of the invention:

EXAMPLE 1

Quantities of 70–170 mesh sand are placed in one inch diameter by seven inch long glass tubes. The tubes are stoppered at both ends, with one-hole rubber stoppers. A screen is positioned over the bottom stopper of each of the tubes, and the 70–170 mesh sand (approximately 25 gm) is supported on top of the screen to simulate formation sand. The glass tubes include connections so that various fluids can be passed through each tube and sand consolidations formed therein in accordance with the methods of the present invention.

Procedure

Various carrier liquid-resin composition dispersions are prepared by dispersing 12 cc portions of the furfuryl alcohol resin composition described hereinbelow into 400 cc portions of No. 1 diesel oil at room temperature. 48 grams of particulated solid material (33.3 lbs. of solids per gallon of resin composition) are added to each of the dispersions and the resultant carrier liquid-resin composition-solids mixtures are flowed through the above-described glass tubes so that the solids are deposited on top of the 70–170 mesh sand contained therein. The solids added to the dispersions include 40–60 mesh sand, mixtures of 40–60 mesh sand and 70–170 mesh sand, and mixtures of the foregoing sands and quantities of oil soluble particulated solids, namely, a 4 to 170 mesh hydrocarbon-polymer product having a melting point of 90°F. sold under the trade name UNIBEADS by the Union Oil Company of California. The sands are readily coated by the furfuryl alcohol resin composition and the oil soluble UNIBEADS are not coated thereby.

The furfuryl alcohol resin composition mentioned above is prepared by mixing 100 cc of a commercially available furfuryl alcohol resin (having a specific gravity of 1.205 to 1.222 at 25°C; a pH within the range of about 4.0 to 4.8; and a viscosity within the range of about 240 to 440 cp at 25°C) with 100 cc of furfuryl alcohol, 1 cc of a resin-to-sand coupling agent (gamma-aminopropyltriethoxysilane) and 1 cc of a cationic de-emulsifying surfactant.

The resin composition-solids mixtures are introduced and deposited in the tubes by squeezing the entire 300 cc portions of diesel oil carrier liquid through the tubes. A 50 cc portion of No. 1 diesel oil is next flowed through the tubes to simulate a spacer followed by 300 cc of No. 1 diesel oil containing 1% by weight trichloroacetic acid hardening agent. After flowing the hardening agent-diesel oil solution through the resin composition-solids mixtures to bring about the hardening thereof, the tubes are sealed at the bottom, placed in a 140°F. water bath and allowed to cure for approximately 48 hours. The resulting consolidations are cooled and tested for permeability in a conventional manner. Each consolidation is divided into three sections, i.e., the introduced solids, the interface between the introduced solids and the simulated formation sands, and the simulated formation sand, and each section is independently tested for permeability.

The consolidations containing soluble solids are flushed with 140°F oil for 20 minutes to dissolve the solids prior to testing the consolidations for permeability. The results of these tests are shown in Table I below.

TABLE I

PERMEABILITIES OF FURFURYL ALCOHOL RESIN COMPOSITION CONSOLIDATIONS USING VARIOUS SOLID MATERIALS

| Introduced Solids Used | Section of Consolidation Tested | Permeability, Darcies |
| --- | --- | --- |
| 40–60 mesh sand | Introduced Solids | 35.8 |
|  | Interface | 12.4 |
|  | Formation Sands[1] | 8.6 |
| 40–60 mesh sand mixed with 15% by weight 70–170 mesh sand | Introduced Solids | 26.8 |
|  | Interface | 4.7 |
|  | Formation Sands[1] | 8.6 |
| 40–60 mesh sand mixed with 20% by weight 4–170 mesh oil soluble solids | Introduced Solids | 84.1 |
|  | Interface | 16.7 |
|  | Formation Sands[1] | 8.6 |
| 40–60 mesh sand mixed with 15% by weight 70–170 mesh sand and 20% by weight 4–170 mesh oil soluble solids | Introduced Solids | 50.3 |
|  | Interface | 8.3 |
|  | Formation Sands[1] | 8.6 |
| 40–60 mesh sand mixed with 15% by weight 70–170 mesh sand-silica flour mixture (96.5% by weight sand:3.5% silica flour) | Introduced Solids | 20.2 |
|  | Interface | 2.75 |
|  | Formation Sands[2] | 5.2 |
| 40–60 mesh sand | Introduced Solids | 46.4 |

TABLE I-continued

PERMEABILITIES OF FURFURYL ALCOHOL RESIN COMPOSITION CONSOLIDATIONS USING VARIOUS SOLID MATERIALS

| Introduced Solids Used | Section of Consolidation Tested | Permeability, Darcies |
| --- | --- | --- |
| mixed with 15% by weight 70–170 mesh sand-silica flour mixture (96.5% by weight sand:3.5% silica flour) and 20% by weight 4–170 mesh oil soluble solids | Interface | 4.3 |
|  | Formation Sands[2] | 5.2 |

[1]Simulated formation sand is 70–170 mesh sand having a permeability of about 9 to 10 darcies.
[2]Simulated formation sand is a mixture of 70–170 mesh sand and silica flour (96.5% by weight sand:3.5% silica flour) having a permeability of about 6 darcies.

From Table I it can be seen that the consolidations formed in accordance with the method of the present invention exhibit improved permeability. Further, improved permeability is obtained even where the introduced inert solids consist of different sizes of sand mixed together which simulate consolidations containing mixtures of introduced and formation solids.

EXAMPLE 2

The procedure set forth in Example 1 above is repeated except that quantities of particulated solids are added to the carrier liquid-furfuryl alcohol resin composition dispersions at a ratio of 33 lbs solids per gallon of resin composition and the solids are mixtures of 40–60 mesh sand and various concentrations of 4–170 mesh oil soluble solids.

The results of these tests are shown in Table II below:

TABLE II

PERMEABILITIES OF FURFURYL ALCOHOL RESIN COMPOSITION CONSOLIDATIONS USING VARIOUS OIL SOLUBLE SOLID CONCENTRATIONS

| Concentration of 4–170 mesh oil soluble solids, % by weight of total solids | Section of Consolidation Tested | Permeability, Darcies |
| --- | --- | --- |
| 0 | Introduced Solids | 35.2 |
|  | Interface | 14.3 |
| 1 | Introduced Solids | 39.3 |
|  | Interface | 14.5 |
| 2 | Introduced Solids | 45.1 |
|  | Interface | 14.5 |
| 5 | Introduced Solids | 63.9 |
|  | Interface | 16.4 |
| 10 | Introduced Solids | 81.0 |
|  | Interface | 18.1 |
| 20 | Introduced Solids | 84.6 |
|  | Interface | 18.3 |

EXAMPLE 3

The procedure set forth above is repeated except that the consolidations obtained are tested for compressive strength in a conventional manner. The results of these tests are set forth in Table III below:

TABLE III

COMPRESSIVE STRENGTHS OF FURFURYL ALCOHOL RESIN COMPOSITION CONSOLIDATIONS USING VARIOUS OIL SOLUBLE SOLID CONCENTRATIONS

| Concentration of 4–170 mesh Oil Soluble Solids, % by Weight of Total Solids | Compressive Strength, psi |
|---|---|
| 0 | 1800 |
| 4 | 1470 |
| 5 | 960 |
| 10 | 700 |
| 20 | 285 |
| 30 | <50 |

From the data presented in Tables II and III above it can be seen that as the concentration of soluble solids in the consolidations increases, the permeability thereof increases but the compressive strength decreases, and over a soluble solids concentration of about 30%, the compressive strength of the resulting mass is inadequate.

EXAMPLE 4

The same general procedure as that described above in Example 1 is followed except that 7.5 cc portions of a urea-formaldehyde composition (containing commercially available urea-formaldehyde resin having a formaldehyde content of 60% by weight and a urea content of 25% by weight; a pH of approximately 8 at 25°C; a maximum viscosity of 300 cp at 25°C; and a specific gravity of about 1.325 at 25°C are dispersed into 300 cc portions of No. 1 diesel oil at room temperature. Particulated solids are added to the resulting dispersions and the carrier liquid-resin composition-solids mixtures are flowed through glass tubes containing simulated formation sands (70–170 mesh) so that the solids are deposited on top of the formation sands. This is followed by the spacer and hardening agent described in Example 1. The particulated solids added to the dispersions are 40–60 mesh sand and a mixture of 40–60 mesh sand and the 4–170 mesh oil soluble solids described in Example 1. After curing and cooling, the resulting consolidations are tested for permeability in a conventional manner. The results of these tests are shown in Table IV below.

TABLE IV

PERMEABILITIES OF UREA-FORMALDEHYDE RESIN COMPOSITION CONSOLIDATIONS USING VARIOUS SOLID MATERIALS

| Solid Material Used | Quantity of Solid Material, Grams | Consolidation Permeability, Darcies |
|---|---|---|
| 40–60 mesh sand | 50 | 27.9 |
| 40–60 mesh sand and 4–170 mesh Oil soluble solids | 42.5-sand; 7.5-oil soluble solids | 76.2[1] |

[1]After oil soluble solids dissolved by flushing with oil.

EXAMPLE 5

The procedure of Example 3 is repeated except that 3 gm of a phenol-formaldehyde resin composition (containing a commercially available one-step type resin having a medium cure and a rigid set; a specific gravity of about 1.2 at 25°C; an ASTM solids content of about 77%; and a viscosity of about 3200 cps at 25°C) is dispersed into 300 cc of No. 1 diesel oil carrier liquid. 300 cc of No. 1 diesel oil containing 2% by weight trichloroacetic acid hardening agent is used for causing hardening of the resin composition. The results of these tests are shown in Table V below:

TABLE V

PERMEABILITIES OF PHENOL-FORMALDEHYDE RESIN COMPOSITION CONSOLIDATIONS[1] USING VARIOUS SOLID MATERIALS

| Solid Material Used | Quantity of Solid Material, grams | Section of Consolidation Tested | Consolidation Permeability, Darcies |
|---|---|---|---|
| 40–60 mesh sand | 50 | Introduced Solids | 16.1 |
|  |  | Interface | 4.05 |
| 40–60 mesh sand and 4–170 mesh oil soluble solids | 42.5-sand; 7.5-oil soluble solids | Introduced Solids | 25.1[2] |
|  |  | Interface | 9.6[2] |

[1]Consolidations cured for 72 hours at 140°F.
[2]After oil soluble solids dissolved by flushing with oil.

From the foregoing it can be seen that the consolidations formed by the present invention exhibit improved permeabilities at the interface between the introduced solids and the simulated formation solids as well as in the mass of introduced solids.

EXAMPLE 6

The procedure of Example 3 is repeated except that 11 cc of an aqueous solution of a trimethylomelamine resin composition (containing a commercially available 50% by weight water solution of an unfilled powdered melamine formaldehyde resin having hydrophobe at 86°F of 20% to 28% by weight solids, the pH of said solution being in the range of about 8.8 to 9.6) is dispersed into 350 cc of No. 1 diesel oil carrier liquid. The results of these tests are shown in Table VI below:

TABLE VI

PERMEABILITIES OF MELAMINE RESIN COMPOSITION CONSOLIDATIONS[1] USING VARIOUS SOLID MATERIALS

| Solid Material Used | Quantity of Solid Material, grams | Section of Consolidation Tested | Consolidation Permeability, Darcies |
|---|---|---|---|
| 40–60 mesh sand | 50 | Introduced Solids | 10.1 |
|  |  | Interface | 0.047 |
| 40–60 mesh sand and 4–170 mesh oil soluble solids | 42.5-sand; 7.5-oil soluble | Introduced Solids | 46.3[2] |
|  |  | Interface | 0.103[2] |

TABLE VI-continued
PERMEABILITIES OF MELAMINE RESIN COMPOSITION CONSOLIDATIONS[1] USING VARIOUS SOLID MATERIALS

| Solid Material Used | Quantity of Solid Material, grams | Section of Consolidation Tested | Consolidation Permeability, Darcies |
|---|---|---|---|
| | solids | | |

[1]Consolidations cured for 72 hours at 140°F.
[2]After oil soluble solids dissolved.

EXAMPLE 7

The procedure of Example 3 is repeated except that two cc of a commercially available polyurethane resin composition dispersed in 300 cc of No. 1 diesel oil carrier liquid and 100 cc of No. 1 diesel oil containing 2% by weight 2-4-6 tris (dimethylaminoethyl) phenol hardening agent are used. The results of these tests are shown in Table VII below:

TABLE VII
PERMEABILITIES OF POLYURETHANE RESIN[1] CONSOLIDATIONS[2] USING VARIOUS SOLID MATERIALS

| Solid Material Used | Quantity of Solid Material, grams | Consolidation Permeability, Darcies |
|---|---|---|
| 40–60 mesh sand | 50 | 31 |
| 40–60 mesh sand and 4–170 mesh oil soluble solids | 42.5-sand; 7.5-oil soluble solids | 80[3] |

[1]Polyurethane resin commercially available from DuPont under the trade designation RD2071.
[2]Consolidations cured for 72 hours at 140°F.
[3]After oil soluble solids dissolved.

EXAMPLE 8

The procedure of Example 3 is repeated except that 3 grams of a commercially available epoxy resin composition (containing a condensation product of allyl glycidyl ether of bisphenol-A having a color of 5 maximum Gardner at 25°C; a viscosity in the range of 40 to 100 poises at 25°C; and an epoxide equivalent within the range of 180 to 195) dispersed in 200 cc of No. 1 diesel oil and 100 cc of No. 1 diesel oil containing 1% by weight 2-4-6 tris (dimethylaminoethyl) phenol hardening agent are used. The results of these tests are shown in Table VIII below:

TABLE VIII
PERMEABILITIES OF EPOXY RESIN[1] COMPOSITION CONSOLIDATIONS[2] USING VARIOUS SOLID MATERIALS

| Solid Material Used | Quantity of Solid Material, grams | Consolidation Permeability, Darcies |
|---|---|---|
| 40–60 mesh sand | 50 | 34.5 |
| 40–60 mesh sand and 4–170 mesh oil soluble solids | 42.5-sand; 7.5-oil soluble solids | 76[3] |

[1]Epoxy Resin sold by Shell Oil Corporation under the trade name EPON 820 having a viscosity of about 60 centipoises.
[2]Consolidations cured for 72 hours at 140°F.
[3]After oil soluble solids dissolved.

EXAMPLE 9

The procedure of Example 1 is repeated except that 80 to 100 mesh granular urea is substituted for the oil soluble solids. After curing, 1000 cc of brine and 1000 cc of No. 1 diesel oil at 140°F are flushed through the consolidation produced. The final consolidation has a compressive strength of 640 psi and a permeability of 53 darcies. A consolidation made in the identical manner but with sand only has a permeability of 31 darcies.

EXAMPLE 10

The general procedure of Example 1 is followed except that the concentration of oil soluble solids is varied. The results of these tests are shown in Table IX:

TABLE IX
PERMEABILITIES OF FURFURYL ALCOHOL COMPOSITION CONSOLIDATIONS USING VARIOUS SOLID MATERIALS AT VARIOUS CONCENTRATIONS

| Solid Material Used | Quantity of Solid Material, grams | Concentration of Oil Soluble Solids, % By Weight of Total Solids | Section of Consolidation Tested | Consolidation Permeability, Darcies |
|---|---|---|---|---|
| 40–60 mesh sand | 50 | 0 | Introduced Solids | 35.0 |
| | | | Interface | 14.4 |
| 40–60 mesh sand and 4–170 mesh oil soluble solids | 49.5-sand; 0.5-oil soluble solids | 1 | Introduced Solids | 65.8 |
| | | | Interface | 14.2 |
| 40–60 mesh sand and 4–170 mesh oil soluble solids | 47.5-sand; 2.5-oil soluble solids | 5 | Introduced Solids | 67.2 |
| | | | Interface | 15.5 |
| 40–60 mesh sand and 4–170 mesh oil soluble solids | 45-sand; 5-oil soluble solids | 10 | Introduced Solids | 67.4 |
| | | | Interface | 16.1 |
| 40–60 mesh sand and 4–170 mesh oil soluble solids | 40-sand; 10-oil soluble solids | 20 | Introduced Solids | 69.8 |
| | | | Interface | 17.6 |
| 40–60 mesh sand and 4–170 mesh oil soluble solids | 35-sand; 15-oil soluble solids | 30 | Introduced Solids | >80[1] |
| | | | Interface | 20.02 |

[1]Consolidation strength inadequate for permeability test.

From the foregoing it can be seen that improvement in consolidation permeability is obtained at a soluble solids concentration of 1%, and at a soluble solids concentration of 30% the strength of the resulting consolidation is inadequate.

EXAMPLE 11

The procedure of Example 1 is repeated except that 40 grams of 40–60 mesh sand mixed with 10 grams of 4–170 mesh oil soluble solids are added to the carrier liquid-resin composition dispersion, and the resulting mixture is circulated in a conventional consistometer for 75 minutes to simulate pumping the mixture down a well bore into a subterranean formation. The temperature of the mixture is raised from 80°F to 126°F during the first 30 minutes of circulation and held at 126°F during the remaining time. After being introduced and deposited in a glass tube containing simulated formation sand (70–170 mesh), the resin-solids mixture is contacted with the hardening agent solution described in Example 1, and then cured for 96 hours at 160°F to simulate curing in a formation approximately 10,000–12,000 ft. deep (160°F bottom hole temperature). The resulting consolidation is flushed with 600 cc of No. 1 diesel oil at a temperature of 160°F to simulate producing formation fluids through the consolidation to dissolve the oil soluble solids therein. Identical consolidations are made without using the oil soluble solids, and permeability tests are carried out on the various consolidations obtained for comparison purposes. The results of these tests are shown in Table X below:

TABLE X

PERMEABILITIES OF FURFURYL ALCOHOL RESIN COMPOSITION CONSOLIDATIONS USING VARIOUS SOLIDS AND CURED AT 160°F

| Solids Used | Quantity of Solids, Grams | Concentration of Oil Soluble Solids, % by Weight of Total Solids | Section of Consolidation Tested | Consolidation Permeability, Darcies |
|---|---|---|---|---|
| 40–60 mesh sand | 50 | 0 | Introduced Solids | 31.1 |
| | | | Interface | 10.0 |
| 40–60 mesh sand and oil soluble solids | 50 | 20 | Introduced Solids | 53.4 |
| | | | Interface | 13.3 |

The method of the present invention is particularly suitable for controlling loose sands in oil, water and gas well formations. In addition, the highly permeable solid mass formed in accordance with the present invention may be utilized in a variety of other applications, as for example, in propping fractures induced in rock formations. In the application of propping fractures, after fractures have been induced in a subterranean rock formation, a highly permeable solid mass of the present invention is deposited in the fractures adjacent to the well bore so that the fractures are prevented from closing, but the flow of produced fluids from the fractures into the well bore is not appreciably inhibited.

While preferred embodiments of the present invention have been described for the purposes of disclosure, it is to be understood that the description and foregoing examples are given for the purposes of illustrating and explaining the invention, and suitable variations may be made within the scope of the appended claims without departing from the invention.

What is claimed is:

1. A method of forming a hard, highly permeable mass between a gravel packing solids retainer traversing a well penetrating a subterranean formation and the subterranean formation, which comprises the steps of:

dispersing a quantity of a resin composition into a carrier liquid;

introducing a quantity of particulated solid material into the carrier liquid-resin composition dispersion, said particulated solid material being comprised of a mixture of inert solids which are coated by said resin composition and soluble solids which are not coated by said resin composition; wherein the soluble solids are solid particles comprised of a homogenous mixture of a hydrocarbon wax and a polymer, said solid particles being insoluble in the carrier liquid at ambient temperature, but oil soluble upon reaching the subteranean formation temperatures;

depositing a sufficient quantity of the resultant resin composition-solids mixture between said retainer and the subterranean formation to form a permeable mass of said resin composition-solids mixture throughout the annulus defined by said retainer and the subterranean formation;

causing the resin composition to harden so that the solids are consolidated into a hard permeable mass; and thereafter dissolving the uncoated soluble solids so that a highly permeable solid mass is formed.

2. The method of claim 1 wherein the resin composition includes an acid curable resin selected from the group consisting of urea-formaldehyde resin, melamine resin, phenol-formaldehyde resin, epoxy resin, polyurethane resin, polyester resin and furfuryl alcohol resin.

3. The method of claim 2 wherein the inert solids which are coated are sand particles.

4. The method of claim 3 wherein the soluble solids are present in an amount of from about 1% by weight to about 30% by weight of the particulated solid material introduced into the carrier liquid-resin composition dispersion.

5. The method of claim 3 wherein the carrier liquid is a liquid hydrocarbon.

6. The method of claim 5 wherein the polymer is selected from the group consisting of copolymers of ethylene and vinyl acetate and copolymers of ethylene and ethyl acetate.

7. The method of claim 1 wherein the soluble solids are present in an amount of from about 1% by weight to about 20% by weight of the particulated solid material introduced into the carrier liquid-resin composition dispersion.

8. A method of forming a hard, highly permeable mass in a subterranean formation through a well penetrating said formation, comprising mixing in a carrier liquid a quantity of particulate solid material with a quantity of resin composition, the particulated solid material being comprised of a mixture of inert solids which are coated by said resin composition and soluble solid particulate material which are not coated by said resin composition, wherein the soluble material is solid particles comprised of a homogeneous mixture of a hydrocarbon wax and a polymer, said solid particles being insoluble at ambient temperatures, but oil soluble upon reaching the subterranean formation temperatures; depositing a sufficient quantity of the resin composition particulated solid material mixture in said subterranean formation to form a permeable mass in said subterranean formation capable of allowing fluids to pass therethrough; causing said resin composition in said mass to harden forming a consolidated permeable mass; and dissolving the soluble solid particulate material, thereby forming a highly permeable consolidated mass in the subterranean formation.

9. A method of claim 8 of forming a hard, highly permeable mass in a permeable subterranean formation, comprising mixing in a hydrocarbon carrier liquid a quantity of particulated solid material with a quantity of resin composition, said particulated solid material comprising a mixture of inert solids and soluble solid particulate material which are about the same particle size, said inert solids being coated with said resin composition and said soluble solid particulate material not being coated by said resin composition; depositing a sufficient quantity of resin composition-particulated solid material mixture in said subterranean formation to form a permeable mass in said subterranean formation capable of allowing fluids to pass therethrough; causing said resin composition in said mass to harden, thereby forming a consolidated permeable mass; and dissolving the soluble solid particulate material, thereby forming a highly permeable mass in said subterranean formation.

10. A method of claim 8 of forming a hard, highly permeable mass in a permeable subterranean formation, comprising mixing in a hydrocarbon carrier liquid a quantity of particulated solid material with a quantity of resin composition, the particulated solid material being comprised of a mixture of inert solids which are coated by said resin composition and soluble solid particulate material which are not coated by said resin composition; depositing a sufficient quantity of the resin composition-particulated solid material mixture in said subterranean formation by pumping said mixture into said subterranean formation and forcing said carrier liquid into said formation, thereby forming a permeable mass in said zone; causing said resin composition in said mass to harden, forming a consolidated permeable mass; and dissolving the soluble solid particulate material, thereby forming a highly permeable mass in said subterranean formation.

11. A method of claim 8 of forming a hard, highly permeable mass in a permeable subterranean formation, comprising mixing in a carrier liquid a quantity of particulated solid material with a quantity of resin composition, the particulated material being comprised of a mixture of inert solids which are coated by said resin composition and about 1-30% by weight of the particulated solid material of a soluble solid particulate material which are not coated by said resin composition, said inert solids and soluble solid particulate material having about the same particle size; depositing a sufficient quantity of the resin composition-particulated solid material mixture in said subterranean formation to form a permeable mass in said subterranean formation capable of allowing fluid to pass therethrough; causing said resin composition in said mass to harden, forming a consolidated permeable mass; and dissolving the soluble solid particulate material, thereby forming a highly permeable consolidated mass in said subterranean formation.

12. A method of claim 8 of forming a hard, highly permeable mass in the annulus between a retainer in a well penetrating a subterranean formation and said subterranean formation, comprising depositing a sufficient quantity of the resultant resin composition-solids mixture in the annulus between said retainer and adjacent said subterranean formation to form a permeable mass in said annulus capable of allowing fluids to pass therethrough; causing said resin composition to harden in the annulus, forming a consolidated permeable mass; and dissolving the soluble solids in said mass, thereby forming a highly permeable consolidated mass in the annulus.

13. The method of claim 12 wherein the resin composition includes an acid curable resin selected from the group consisting of urea-formaldehyde resin, melamine resin, phenol-formaldehyde resin, epoxy resin, polyurethane resin, polyester resin and furfuryl alcohol resin.

14. The method of claim 12 wherein the inert solids which are coated by the resin composition are sand particles.

15. The method of claim 14 wherein the soluble solids are present in an amount of from about 1% by weight to about 30% by weight of the particulated solid material combined with the resin composition.

16. The method of claim 14 wherein the soluble solids are oil soluble solid particles comprised of a homogeneous mixture of a hydrocarbon wax and a polymer selected from the group consisting of copolymers of ethylene and vinyl acetate and copolymers of ethylene and ethyl acetate.

17. The method of claim 16 wherein the soluble solids are present in an amount of from about 1% by weight to about 20% by weight of the particulated solid material combined with the resin composition.

18. A process for forming a permeable mass in a subterranean formation by depositing in said formation a mixture of inert particulate solid material and a resin composition which coats said inert solid material dispersed in a carrier liquid, hardening the resin composition thereby consolidating said inert particulate material into a permeable mass, the improvement of mixing with said inert particulate material, and said resin composition based on total particulate material, about 1-30% by weight soluble solid particulate material which are not coated by said resin, wherein the soluble material is solid particles comprised of a homogenous mixture of a hydrocarbon wax and a polymer, said solid particles being insoluble in the carrier liquid at ambient temperatures, but oil soluble upon reaching the subterranean formation temperature, and dissolving said soluble solids after consolidation to form a highly permeable mass in said zone.

\* \* \* \* \*